United States Patent
Carr et al.

(10) Patent No.: US 10,386,933 B2
(45) Date of Patent: Aug. 20, 2019

(54) CONTROLLING NAVIGATION OF A VISUAL AID DURING A PRESENTATION

(71) Applicant: INTERNATIONAL BUSINESS MACHINES CORPORATION, Armonk, NY (US)

(72) Inventors: Kevin C. Carr, Durham, NC (US); Al Chakra, Apex, NC (US); Jeremy Crafts, Raleigh, NC (US); Bryan M. Dempsey, Clinton Corners, NY (US); Marit L. Imsdahl, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 15/250,975

(22) Filed: Aug. 30, 2016

(65) Prior Publication Data
US 2018/0059796 A1    Mar. 1, 2018

(51) Int. Cl.
| | |
|---|---|
| *G06F 3/048* | (2013.01) |
| *G06F 3/01* | (2006.01) |
| *G06F 3/03* | (2006.01) |
| *G06F 3/0346* | (2013.01) |
| *G06F 3/0488* | (2013.01) |

(52) U.S. Cl.
CPC ............ *G06F 3/017* (2013.01); *G06F 3/0304* (2013.01); *G06F 3/0346* (2013.01); *G06F 3/04886* (2013.01); *G06F 2203/0381* (2013.01)

(58) Field of Classification Search
CPC ....................................................... G06F 3/048
See application file for complete search history.

(56) References Cited

U.S. PATENT DOCUMENTS

| | | |
|---|---|---|
| 6,415,306 B2 | 7/2002 | Seaman |
| 6,889,138 B1 | 5/2005 | Krull et al. |
| 6,892,135 B1 | 5/2005 | Krull et al. |
| 7,308,359 B1 | 12/2007 | Krull et al. |
| 7,328,158 B1 | 2/2008 | Burridge et al. |

(Continued)

FOREIGN PATENT DOCUMENTS

| | | | | |
|---|---|---|---|---|
| EP | 1892608 A1 | * | 2/2008 | ........... G06F 3/0386 |
| JP | 2018005011 A | | 1/2018 | |
| WO | 02052527 A1 | | 7/2002 | |

OTHER PUBLICATIONS

List of IBM Patents or Patent Applications Treated as Related; (Appendix P), Date Filed Aug. 30, 2016 2 pages.

(Continued)

*Primary Examiner* — Pei Yong Weng
(74) *Attorney, Agent, or Firm* — Cantor Colburn LLP; Teddi Maranzano (57) ABSTRACT

Methods, systems and computer program products controlling navigation of a visual aid during a presentation are provided. Aspects include obtaining a presenter profile that includes associations between gestures of a presenter and desired actions for the visual aid and receiving indications of one or more movements of a presenter during the presentation. Aspects also include determining whether the one or more movements correlate to a gesture included in the presenter profile and based on a determination that the one or more movements correlate to the gesture included in the presenter profile, executing in the visual aid a desired action associated with the gesture.

20 Claims, 4 Drawing Sheets

(56) References Cited

U.S. PATENT DOCUMENTS

| | | |
|---|---|---|
| 8,161,246 B2 | 4/2012 | Hooker et al. |
| 8,219,633 B2 | 7/2012 | Fainberg et al. |
| 8,321,533 B2 | 11/2012 | Fainberg et al. |
| 8,346,885 B2 | 1/2013 | Fainberg et al. |
| 8,433,853 B2 | 4/2013 | Eddy et al. |
| 8,482,381 B2 | 7/2013 | Chatterjee et al. |
| 8,661,090 B2 | 2/2014 | Fainberg et al. |
| 8,687,023 B2 | 4/2014 | Markiewicz et al. |
| 8,707,174 B2 | 4/2014 | Hinckley et al. |
| 8,751,970 B2 | 6/2014 | Hinckley et al. |
| 8,856,263 B2 | 10/2014 | Fainberg et al. |
| 9,020,825 B1 | 4/2015 | Garber |
| 9,116,989 B1 | 8/2015 | Ehlen et al. |
| 9,223,413 B2 | 12/2015 | Pakki et al. |
| 9,335,913 B2 | 5/2016 | Stephenson et al. |
| 9,652,402 B2 | 5/2017 | Venkatasubramanian et al. |
| 9,681,094 B1 | 6/2017 | Faulkner et al. |
| 9,921,722 B2 | 3/2018 | Phelan-Tran |
| 2002/0080927 A1 | 6/2002 | Uppaluru |
| 2003/0065655 A1 | 4/2003 | Syeda-Mahmood |
| 2005/0005266 A1 | 1/2005 | Datig |
| 2005/0078172 A1* | 4/2005 | Harville ............ H04N 7/142 348/14.09 |
| 2008/0046930 A1 | 2/2008 | Smith et al. |
| 2008/0120665 A1 | 5/2008 | Relyea et al. |
| 2008/0270344 A1 | 10/2008 | Yurick et al. |
| 2009/0106659 A1 | 4/2009 | Rosser et al. |
| 2009/0325705 A1* | 12/2009 | Filer ............ A63F 13/06 463/39 |
| 2010/0169790 A1 | 7/2010 | Vaughan et al. |
| 2011/0093820 A1* | 4/2011 | Zhang ............ A63F 13/06 715/863 |
| 2012/0124090 A1 | 5/2012 | Matz et al. |
| 2012/0323579 A1 | 12/2012 | Gibbon et al. |
| 2013/0280689 A1 | 10/2013 | Meer |
| 2014/0240231 A1* | 8/2014 | Minnen ............ G06F 3/017 345/158 |
| 2015/0169069 A1 | 6/2015 | Lo et al. |
| 2015/0193089 A1 | 7/2015 | Berlin et al. |
| 2015/0350029 A1 | 12/2015 | Skrobotov |
| 2017/0075656 A1 | 3/2017 | Ehlen et al. |
| 2018/0060028 A1 | 3/2018 | Carr et al. |

OTHER PUBLICATIONS

U.S. Appl. No. 15/250,974, filed Aug. 30, 2016; Entitled: Controlling Navigation of a Visual Aid During a Presentation.

List of IBM Patents or Patent Applications Treated As Related; Date Filed: Dec. 14, 2018, 2 pages.

Topaloglu, "Automatic Slide Page Progression Based on Verbal and Visual Cues"; U.S. Appl. No. 16/225,461, filed Dec. 19, 2018.

Mell et al.; "The NIST Definition of Cloud Computing—Recommendations of the National Institute of Standards and Technology"; U.S. Department of Commerce; Sep. 2011; 7 pages.

Pash; "Control PowerPoint Presentations with Your Voice"; LifeHacker <https://lifehacker.com/394832/394832/control-powerpoint-presentations-with-your-voice>; 2 pages.

Prasad et al., "Document Summarization and Information Extraction for Generation of Presentation Slides", 2009 Int'l Conf. on Advances in Recent Technologies in Communication and Computing; 2009 IEEE, pp. 126-128.

* cited by examiner

CONTROLLING NAVIGATION OF A VISUAL AID DURING A PRESENTATION

BACKGROUND

The present invention generally relates to methods and systems for controlling a visual aid during a presentation, and more particularly to methods and systems for controlling the navigation of a visual aid during a presentation.

During meetings and classes it is common for presenters to use visual aids, such as slide decks, to present relevant material. Often the visual aids include a multitude of slides that each contain different information about which the presenter will speak. Currently, presenters navigate through the presentation by using a device that includes two buttons, one of which will advance the visual aid to the next slide and the other of which will revert the visual aid to the previous slide.

Often times during a presentation, the presenter may wish to display a slide out of the planned presentation order, perhaps in response to a question. As the length of the presentation and the number of slide in the visual aid increase, the amount of time it takes for the presenter to navigate through the visual aid to find the desired slide increases. This delay causes a disruption to the flow of the presentation and wastes the time of the presenter and the other individuals in the meeting or class.

SUMMARY

In accordance with an embodiment, a method for controlling navigation of a visual aid during a presentation includes obtaining a presenter profile that includes associations between gestures of a presenter and desired actions for the visual aid and receiving indications of one or more movements of a presenter during the presentation. The method also includes determining whether the one or more movements correlate to a gesture included in the presenter profile and based on a determination that the one or more movements correlate to the gesture included in the presenter profile, executing in the visual aid a desired action associated with the gesture In another embodiment of the invention, a processing system for controlling navigation of a visual aid during a presentation includes a processor configured to control a content displayed on a display screen. The processor is configured to obtain a presenter profile that includes associations between gestures of a presenter and desired actions for the visual aid and receive indications of one or more movements of a presenter during the presentation. The processor is also configured to determine whether the one or more movements correlate to a gesture included in the presenter profile and based on a determination that the one or more movements correlate to the gesture included in the presenter profile, execute in the visual aid a desired action associated with the gesture.

In accordance with a further embodiment, a computer program product for controlling navigation of a visual aid during a presentation includes a non-transitory storage medium readable by a processing circuit and storing instructions for execution by the processing circuit for performing a method. The method includes obtaining a presenter profile that includes associations between gestures of a presenter and desired actions for the visual aid and receiving indications of one or more movements of a presenter during the presentation. The method also includes determining whether the one or more movements correlate to a gesture included in the presenter profile and based on a determination that the one or more movements correlate to the gesture included in the presenter profile, executing in the visual aid a desired action associated with the gesture.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for controlling navigation of a visual aid during a presentation. In exemplary embodiments, during a presentation a presenter uses physical gestures that have been associated with desired actions to control the navigation of a visual aid, such as a slide deck. In exemplary embodiments, a variety of techniques can be used to capture the movements of the presenter and to determine what type of gesture the presenter is making, such as waving a hand, making a thumb up sign, shaking of the head, etc. A presenter profile is used to associate the various types of gestures with desired actions for the visual aid. For example, the presenter may associate a left-hand swipe gesture with advancing the slide deck to the next slide and a right-hand swipe with returning the slide deck to the previous slide.

In exemplary embodiments, during a presentation a processing system monitors the speech of an individual and automatically navigates through the visual aid based on an analysis of the speech. The processing system analyzes the content of the various portions of the visual aid, i.e., the slides of the slide deck, and compares the content of the monitored speech to the content of the portions of the visual aid. Based on this comparison, the processing system automatically advances the visual aid to the slide most relevant to the topic being discussed. In exemplary embodiments, the processing system can be configured to only analyze the speech of the presenter or it may be configured to analyze the speech of multiple individuals, i.e., the presenter and people attending the presentation. In exemplary embodiments, the presenter can configure the processing system to take specific navigational actions in the visual aid in response to detecting keywords spoken by the presenter.

Figure 1:
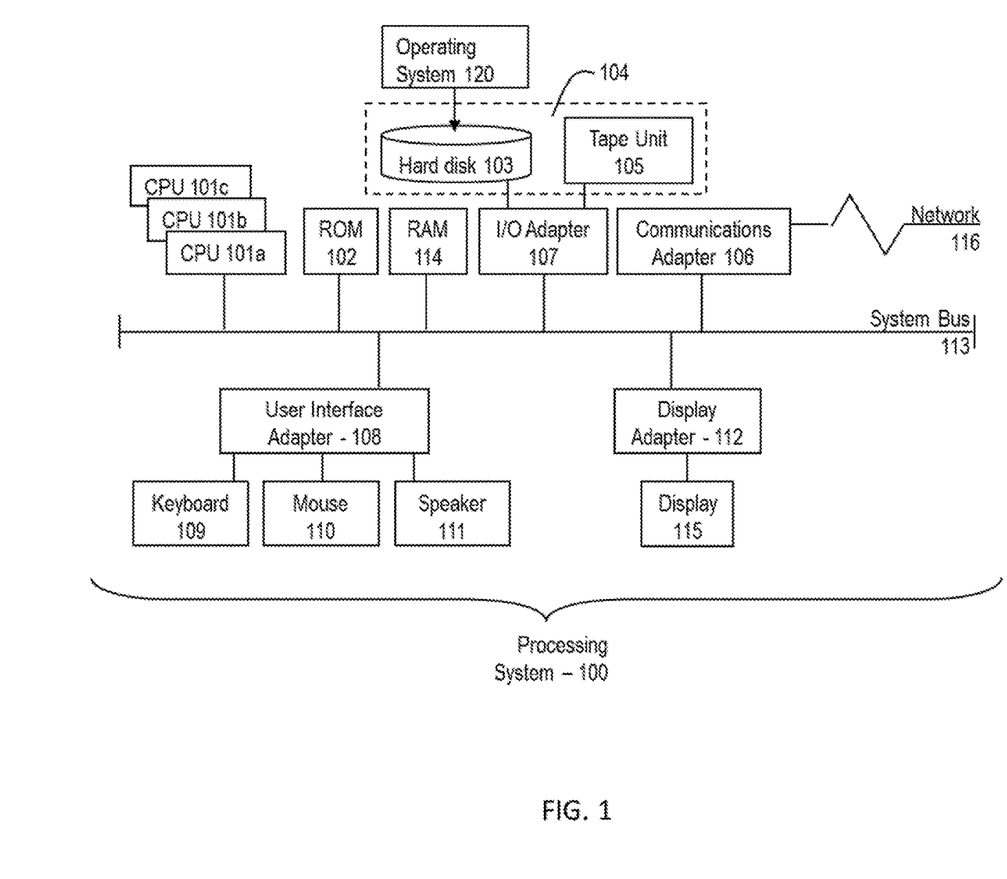
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
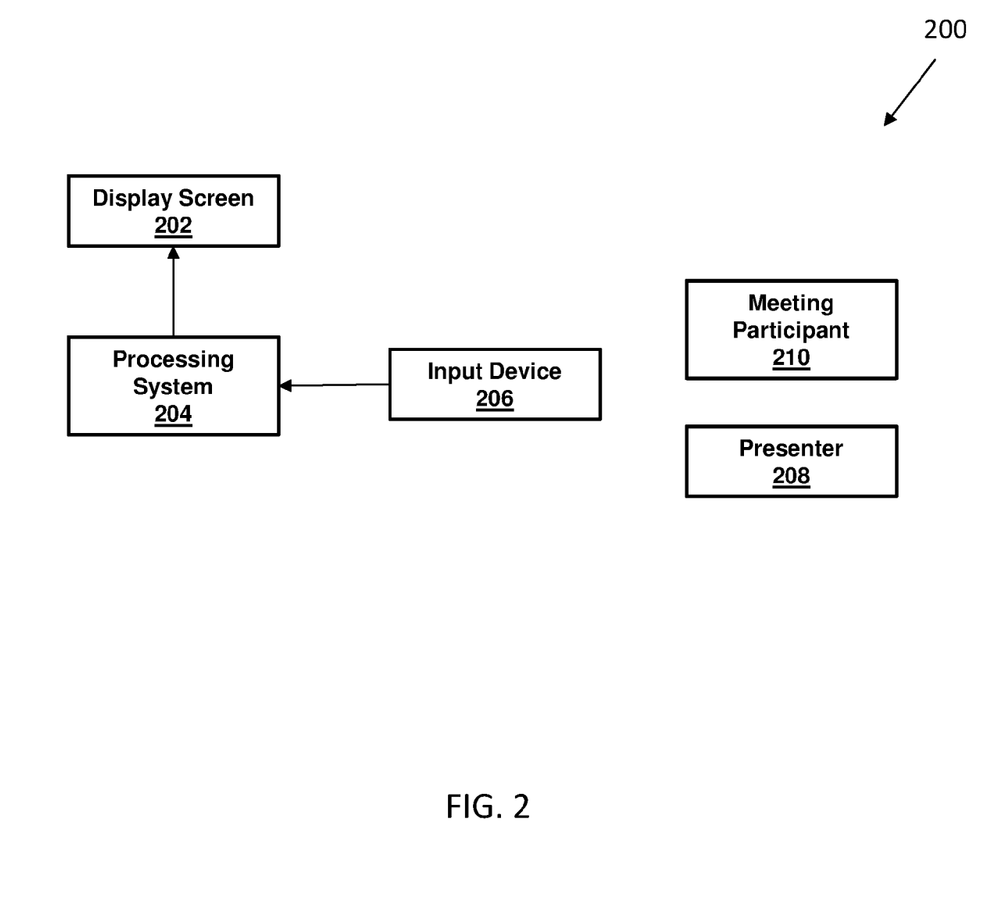
FIG. 2 is a block diagram illustrating a system for controlling navigation of a visual aid during a presentation in accordance with exemplary embodiments.

Referring now to FIG. 2, a system 200 for controlling navigation of a visual aid during a presentation in accordance with an embodiment is shown. As illustrated, the system 200 includes a display screen 202 and a processing system 204, which may be a processing system as shown in FIG. 1. In exemplary embodiments, the display screen 202 may be a television, computer monitor, a projection screen, or the like. The content displayed on the display screen 202 is controlled by the processing system 204. In one embodiment, the processing system 204 is in communication with a projector, which projects content onto the display screen 202. In another embodiment, the processing system 204 is in communication with the display screen 202 to provide content to be displayed directly on the display screen 202.

In exemplary embodiments, the processing system 204 is in communication with an input device 206. In one embodiment, the input device 206 is a microphone, or array of microphones, that is configured to capture the voice of the presenter 208, and optionally other meeting participants 210, during the presentation. In another embodiment, the input device 206 is a camera system that monitors the movements of the presenter 208 during the presentation. In a further embodiment, the input device 206 is an electronic device that is held by the presenter 208 during the presentation, such as a clicker, a smartphone, or the like. The electronic device includes an accelerometer and/or a gyroscope that provides indications of the one or more movements of the presenter 208. In another embodiment, the input device 206 is a wearable electronic device that is worn by the presenter 208 during the presentation. The wearable electronic device includes an accelerometer and/or a gyroscope that provides indications of the one or more movements of the presenter 208.

Figure 3:
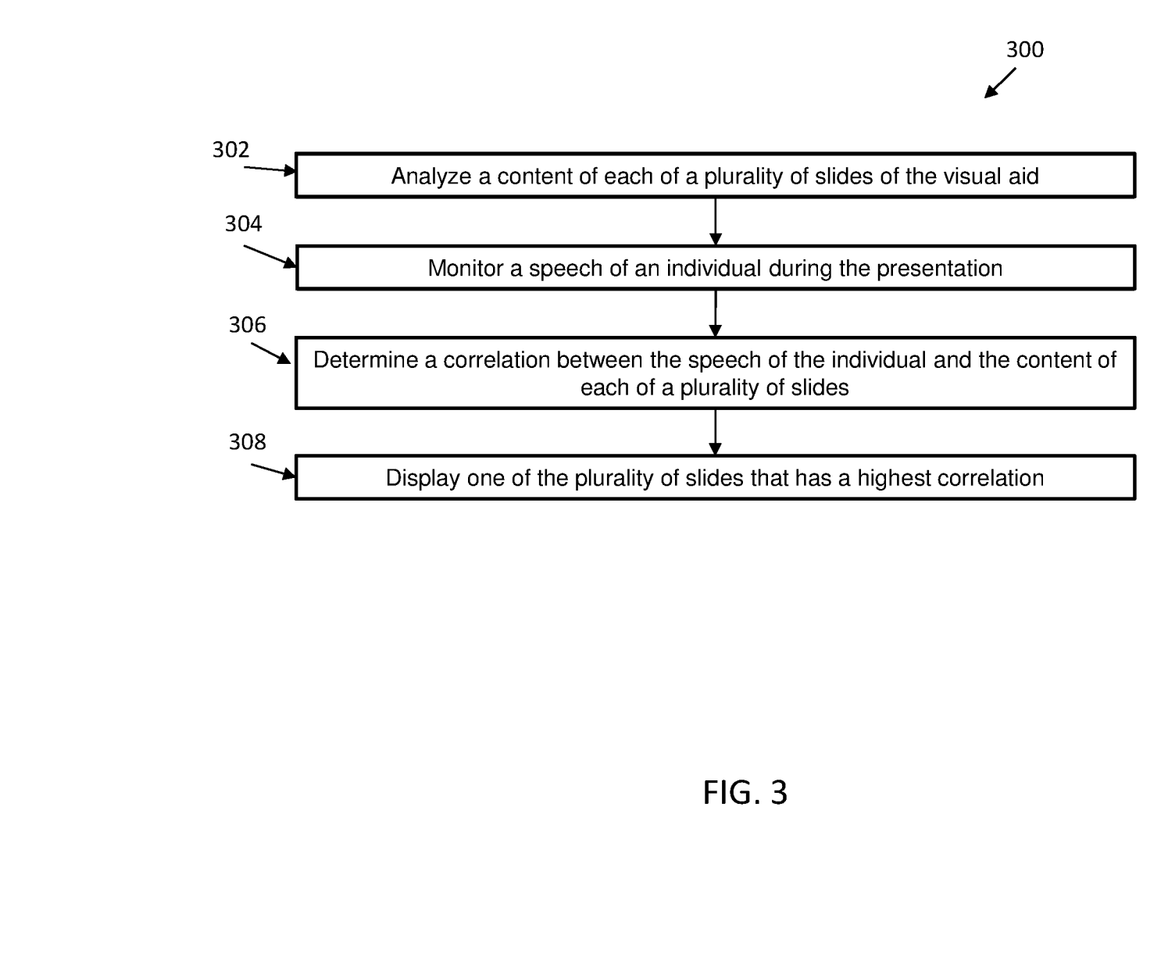
FIG. 3 shows a flow chart illustrating a method for controlling navigation of a visual aid during a presentation in accordance with an embodiment.

Referring now to FIG. 3, a method 300 for controlling navigation of a visual aid during a presentation is shown. As shown at block 302, the method 300 includes analyzing a content of each of a plurality of slides of the visual aid. In exemplary embodiments, analyzing a content of each of a plurality of slides of the visual aid includes analyzing both the content that will be displayed on each slide in addition to presenter notes for each slide that will not be displayed during the presentation. In exemplary embodiments, a presenter may annotate slides with information that indicates the topic that the slide is relevant to. For example, if a slide contains sales a graph for sales projections, the presenter may annotate the slide with the term "sales projections."

The method 300 also includes monitoring a speech of an individual during the presentation, as shown at block 304. The individuals' speech being monitored includes the presenter and/or other meeting participants. In exemplary embodiments, the presenter can selectively control whether the speech of other meeting participants will be monitored based on the environment and/or location of the presentation. For example, in a collaborative meeting in a congenial environment, the presenter may enable the monitoring of the speech of all of the meeting participants. However, in a large informational meeting in an unpredictable environment, the presenter may select to only have their speech monitored.

As shown at block 306, the method 300 also includes determining a correlation between the speech of the individual and the content of each of a plurality of slides. In exemplary embodiments, determining the correlation between the speech of the individual and the content of each of a plurality of slides includes performing a cognitive analysis on the speech of the individual. Next, as shown at block 308, the method 300 includes displaying one of the plurality of slides that has the highest correlation. In exemplary embodiments, a minimum correlation threshold can be set that specifies the minimum correlation between the speech of the individual and the content of each of a plurality of slides that will result in changing the slide that is being displayed.

In one embodiment, the presenter can specify one of the slides in a slide deck to be a default slide that is displayed during the presentation when the monitored speech does not have a minimum correlation to any of the slides in the slide deck. In exemplary embodiments, the method 300 also includes displaying one of the plurality of slides that is designated as a default slide based on the highest correlation being below a threshold value, which may be the same as, or lower than, the minimum correlation threshold.

In exemplary embodiments, the method 300 also includes monitoring the speech for the presence of one or more keywords. In exemplary embodiments, a presenter profile is used to correlate specific keyword, or keyword strings, to specific navigational actions for the visual aid. In exemplary embodiments, based on the determination that the monitored speech of the presenter includes a keyword in the presenter profile, executing in the visual aid the desired action associated with the keyword. The keywords can include, but are not limited to, one or more of next, previous, default, home, and last. In exemplary embodiments, the keywords may also relate to words that are associated with the content of each slide. These keywords can be set by the presenter and can be stored as metadata for each slide. In some embodiments, the keywords may refer to content displayed on the slide or to content stored in notes for the slides that will not be displayed.

Figure 4:
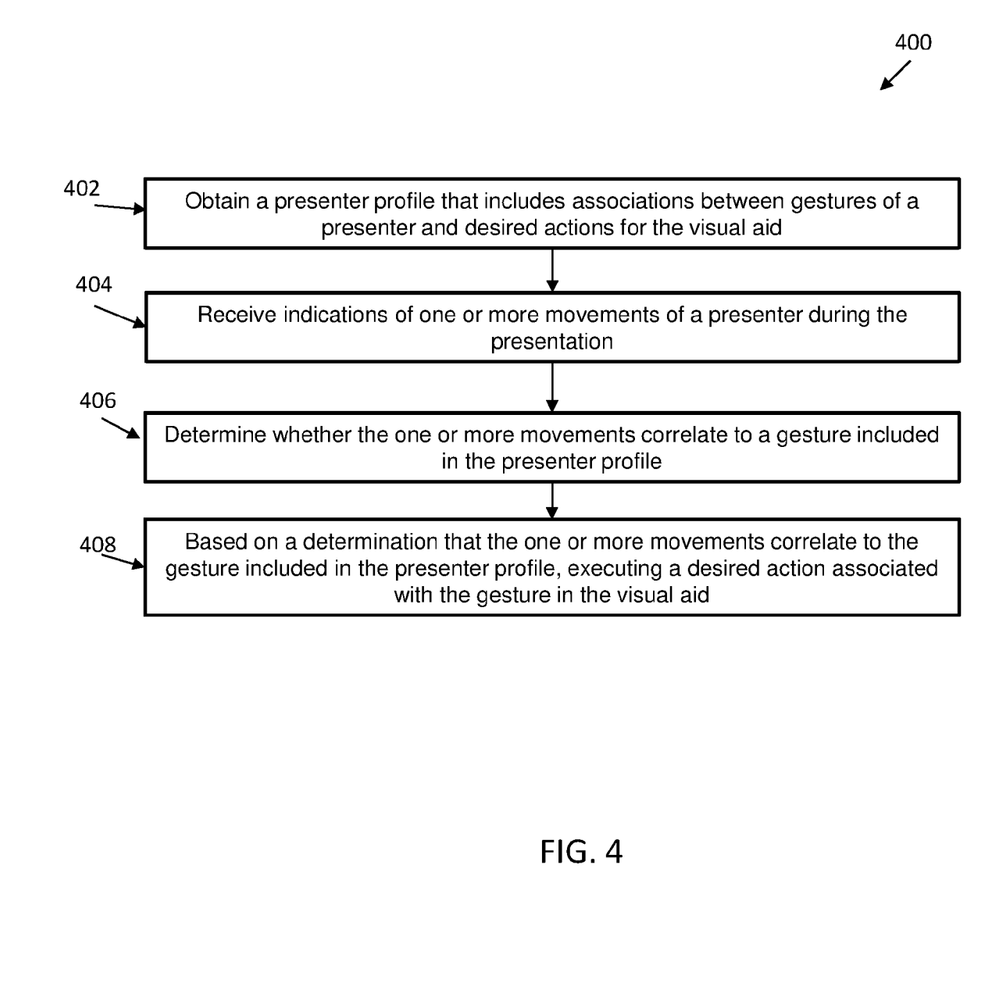
FIG. 4 shows a flow chart illustrating another method for controlling navigation of a visual aid during a presentation in accordance with an embodiment.

Referring now to FIG. 4, another method 400 for controlling navigation of a visual aid during a presentation is shown. As shown at block 402, the method 400 includes obtaining a presenter profile that includes associations between gestures of a presenter and desired actions for the visual aid. In exemplary embodiments, the presenter profile includes a plurality of gestures, such as waving a hand, making a thumb up sign, shaking of the head, etc., that are each associated with a desired action for the visual aid. For example, the presenter may associate a left-hand swipe gesture with advancing the slide deck to the next slide and a right-hand swipe with returning the slide deck to the previous slide.

The method 400 also includes receiving indications of one or more movements of a presenter during the presentation, as shown at block 404. In exemplary embodiments, the indications of the one or more movements can be received from a variety of input devices. In one embodiment, the input device is an electronic device that is held by the user during the presentation, such as a smartphone or a clicker. In another embodiment, the input device is a wearable electronic device that is worn by the presenter during the presentation. In a further embodiment, the input device is a camera system that is configured to monitor the movements of the presenter during the presentation. In exemplary embodiments, one of these input devices, or a combination of multiple input devices, can be used to provide the indications of the one or more movements of the presenter to a processing system.

As shown at block 406, the method 400 includes determining whether the one or more movements correlate to a gesture included in the presenter profile. In exemplary embodiments, the processing system is used to analyze the one or more movements of the presenter that are received from the various input devices and to determine a gesture made by the presenter. The gestures can include, but are not limited to, a hand movement of the presenter, an arm movement of a presenter and a finger movement of an presenter. Next, the processing system looks up the gesture in the presenter profile to determine if that gesture corresponds to the desired action for the visual aid. As shown at block 408, the method 400 includes executing in the visual aid the desired action associated with the gesture based on a determination that the one or more movements correlate to the gesture included in the presenter profile. The desired actions can include, but are not limited to, advancing to the next slide, returning to the previous slide, transitioning to a default slide, transitioning to a home slide, and transitioning to the last slide.

In exemplary embodiments, the presenter profile is configured by the user and can include multiple profile settings that the presenter can choose between depending on the setting and/or location of the presentation. The profile settings in the presenter profile may include a different set of monitored gestures and associated actions that can be selected by the user depending on the setting of the presentation and/or based on the types of input devices that will be used to monitor the movements of the presenter.

In one example, a presenter may select a first profile setting for a presentation that will be given in an auditorium in which the presenter will be on a stage and where a advanced camera system will be used to monitor the movements of the presenter and the position of the presenter on the stage. The first profile setting can include gestures such as the presenter walking across the stage or the presenter turning his back to the audience that can be associated with desired actions.

In another example, a presenter may select a second profile setting for a presentation that will be given in a small conference room in which the presenter will be seated in front of a laptop that is controlling the visual aid and where a camera system will be used to monitor the facial expressions of the presenter. The second profile setting can include gestures such as rolling of the eyes, shaking of the head, etc. that can be associated with desired actions.

In a further example, a presenter may select a third profile setting for a presentation that will be given in a conference room in which the presenter will be seated standing next to a display of the visual aid and where the presenter will be wearing a smartwatch to capture his movements. The third profile setting can include gestures such as waving a hand, raising a hand, etc. that can be associated with desired actions.

In exemplary embodiments, the processing system that controls the navigation of the visual aid during the presentation can automatically select the profile setting for the presenter profile based on the types of input devices that are connected to the processing system. For example, if the processing system detects that a smartwatch is connected to the processing system, the processing system can set the presenter profile to the third profile setting. Likewise, if the processing system detects that an advanced camera system is connected to the processing system, the processing system can set the presenter profile to the first profile setting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for controlling navigation of a visual aid during a presentation, the method comprising:
    obtaining, by a processing system comprising one or more processors, a presenter profile that includes a plurality of profile settings of a presenter, wherein the presenter profile includes, for each profile setting of the plurality of profile settings, a set of gestures and a set of desired actions for the visual aid, wherein the set of desired actions are associated with the set of gestures;
    selecting, by the processing system, a profile setting of the plurality of profile settings based on types of input devices that are connected to the processing system;
    receiving, the processing system, indications of one or more movements of a presenter during the presentation;
    determining whether the one or more movements correlate to a gesture included in the selected profile setting of the presenter profile; and
    based on a determination that the one or more movements correlate to a gesture of the set of gestures included in the selected profile setting of the presenter profile, executing in the visual aid, by the processing system, a desired action associated with the gesture, wherein the desired action associated with the gesture includes at least transitioning to a default slide.

2. The method of claim 1, wherein the indications of the one or more movements of the presenter are received from a camera system configured to monitor the presenter.

3. The method of claim 1, wherein the indications of the one or more movements of the presenter are received from an electronic device that is being held by the presenter.

4. The method of claim 3, wherein the electronic device includes one or more of an accelerometer and a gyroscope that are configured to provide the indications of the one or more movements of the presenter.

5. The method of claim 1, wherein the indications of the one or more movements of the presenter are received from a wearable electronic device that is being worn by the presenter.

6. The method of claim 5, wherein the wearable electronic device includes one or more of an accelerometer and a gyroscope that are configured to provide the indications of the one or more movements of the presenter.

7. The method of claim 1, wherein the set of gestures includes one or more of a hand movement of the presenter, an arm movement of the presenter and a finger movement of the presenter.

8. The method of claim 1, wherein the set of gestures includes one or more of an eye roll by the presenter or a head shake by the presenter.

9. A computer program product for controlling navigation of a visual aid during a presentation, the computer program product comprising:
    a non-transitory storage medium readable by a processing circuit and storing instructions for execution by the processing circuit for performing a method comprising:
        obtaining a presenter profile that includes a plurality of profile settings of a presenter, wherein the presenter profile includes, for each profile setting of the plurality of profile settings, a set of gestures and a set of desired actions for the visual aid, wherein the set of desired actions are associated with the set of gestures;
        selecting, by the processing system, a profile setting of the plurality of profile setting based on types of input devices that are connected to the processing circuit;
        receiving indications of one or more movements of a presenter during the presentation;
        determining whether the one or more movements correlate to a gesture included in the selected profile setting of the presenter profile; and
        based on a determination that the one or more movements correlate to a gesture of the set of gestures included in the selected profile setting of the presenter profile, executing in the visual aid a desired action associated with the gesture, wherein the desired action associated with the gesture includes at least transitioning to a default slide.

10. The computer program product of claim 9, wherein the indications of the one or more movements of the presenter are received from a camera system configured to monitor the presenter.

11. The computer program product of claim 9, wherein the indications of the one or more movements of the presenter are received from an electronic device that is being held by the presenter.

12. The computer program product of claim 11, wherein the electronic device includes one or more of an accelerometer and a gyroscope that are configured to provide the indications of the one or more movements of the presenter.

13. The computer program product of claim 9, wherein the indications of the one or more movements of the presenter are received from a wearable electronic device that is being worn by the presenter.

14. The computer program product of claim 13, wherein the wearable electronic device includes one or more of an accelerometer and a gyroscope that are configured to provide the indications of the one or more movements of the presenter.

15. The computer program product of claim 9, wherein the set of gestures includes one or more of a hand movement of the presenter, an arm movement of the presenter and a finger movement of the presenter.

16. The computer program product of claim 9, wherein the set of gestures includes one or more of an eye roll by the presenter or a head shake by the presenter.

17. A processing system for controlling navigation of a visual aid during a presentation includes a processor configured to control a content displayed on a display screen, the processor configured to:
    obtain a presenter profile that includes a plurality of profile settings of a presenter, wherein the presenter profile includes, for each profile setting of the plurality of profile settings, a set of gestures and a set of desired actions for the visual aid, wherein the set of desired actions are associated with the set of gestures;
    select a profile setting of the plurality of profile settings based on types of input devices that are connected to the processing system;
    receive indications of one or more movements of a presenter during the presentation;
    determine whether the one or more movements correlate to a gesture included in the selected profile setting of the presenter profile; and
    based on a determination that the one or more movements correlate to a gesture of the set of gestures included in the selected profile setting of the presenter profile, executing in the visual aid a desired action associated with the gesture, wherein the desired action associated with the gesture includes at least transitioning to a default slide.

18. The processing system of claim 17, wherein the indications of the one or more movements of the presenter are received from a camera system configured to monitor the presenter.

19. The processing system of claim 17, wherein the indications of the one or more movements of the presenter are received from an electronic device that is being held by the presenter.

20. The processing system of claim 19, wherein the electronic device includes one or more of an accelerometer and a gyroscope that are configured to provide the indications of the one or more movements of the presenter.

* * * * *